July 24, 1956  M. J. SHEFT  2,755,619
EXPANSIBLE CHAMBER MOTOR OPERATED
BY TEMPERATURE VARIATIONS
Filed Sept. 26, 1952  3 Sheets-Sheet 1
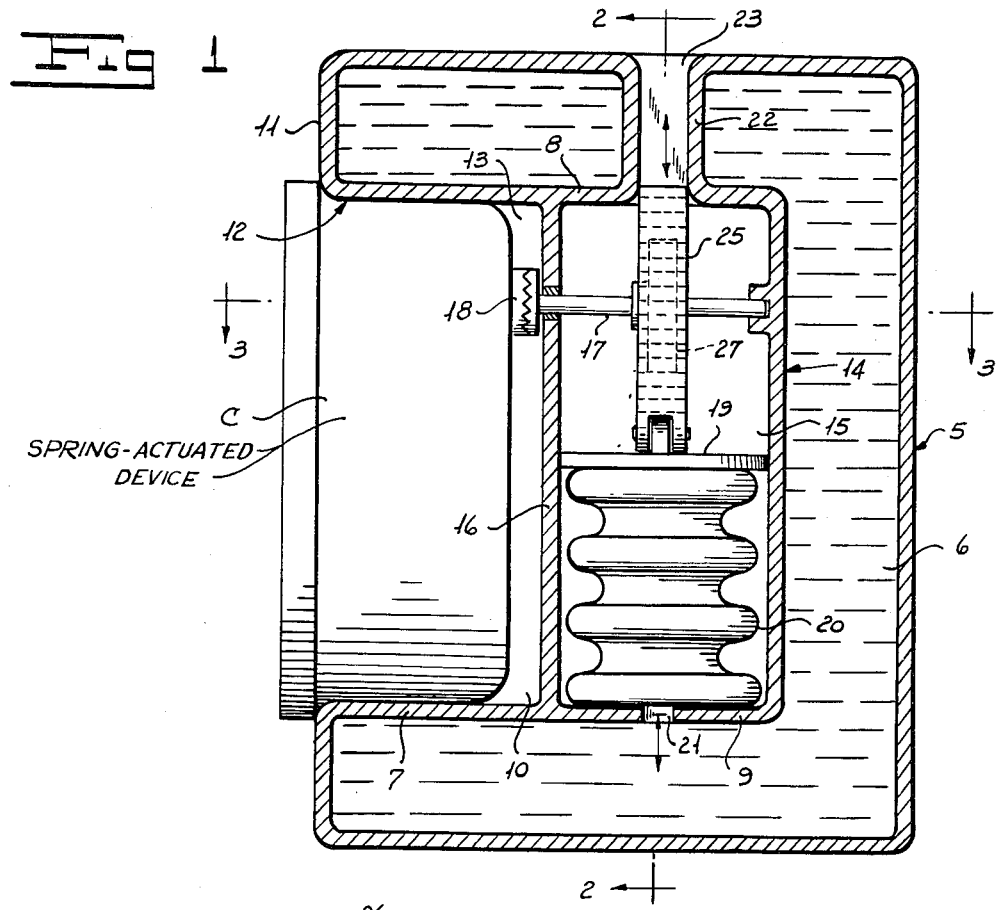
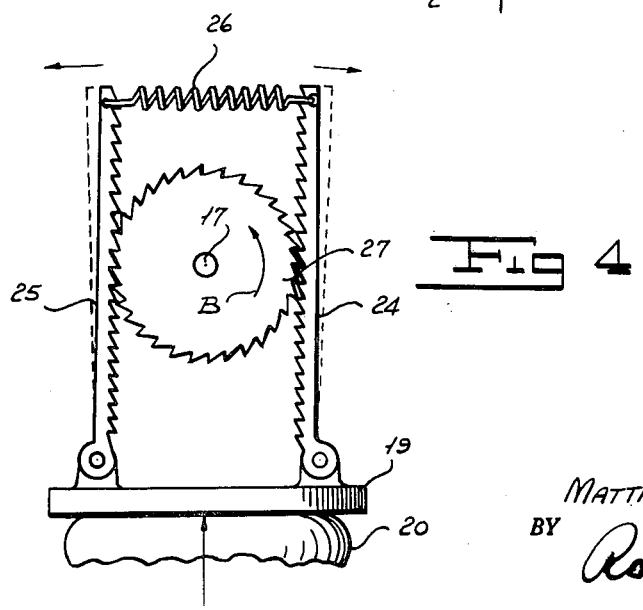
INVENTOR.
MATTHEW JOHN SHEFT
BY Robert F. Beck
ATTORNEY July 24, 1956
M. J. SHEFT
2,755,619
EXPANSIBLE CHAMBER MOTOR OPERATED
BY TEMPERATURE VARIATIONS
Filed Sept. 26, 1952
3 Sheets-Sheet 2
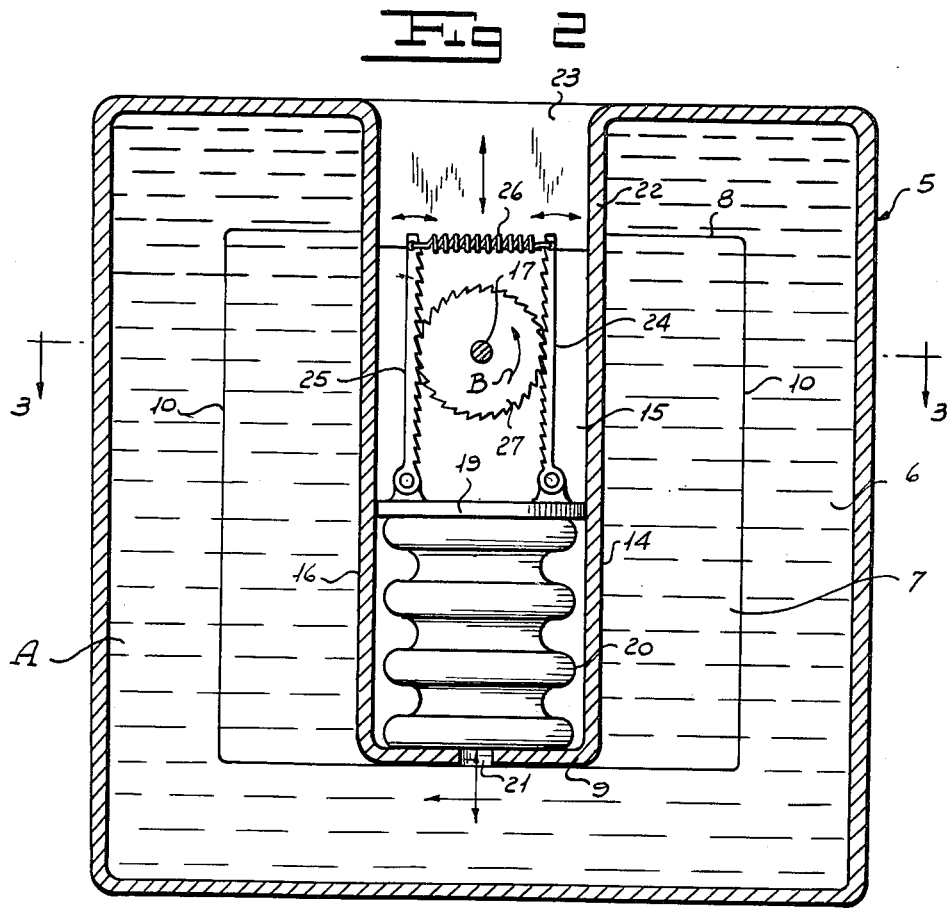
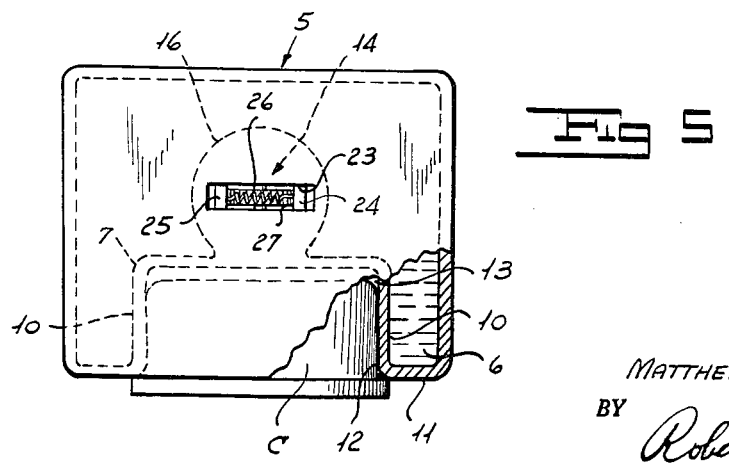
INVENTOR.
MATTHEW JOHN SHEFT
BY
Robert F. Beck
ATTORNEY

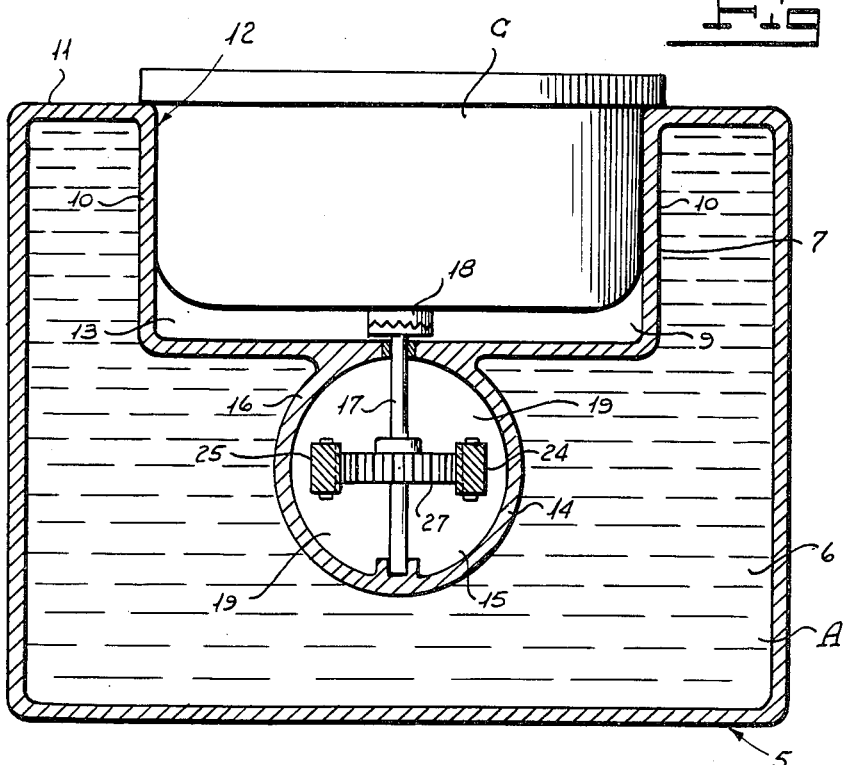
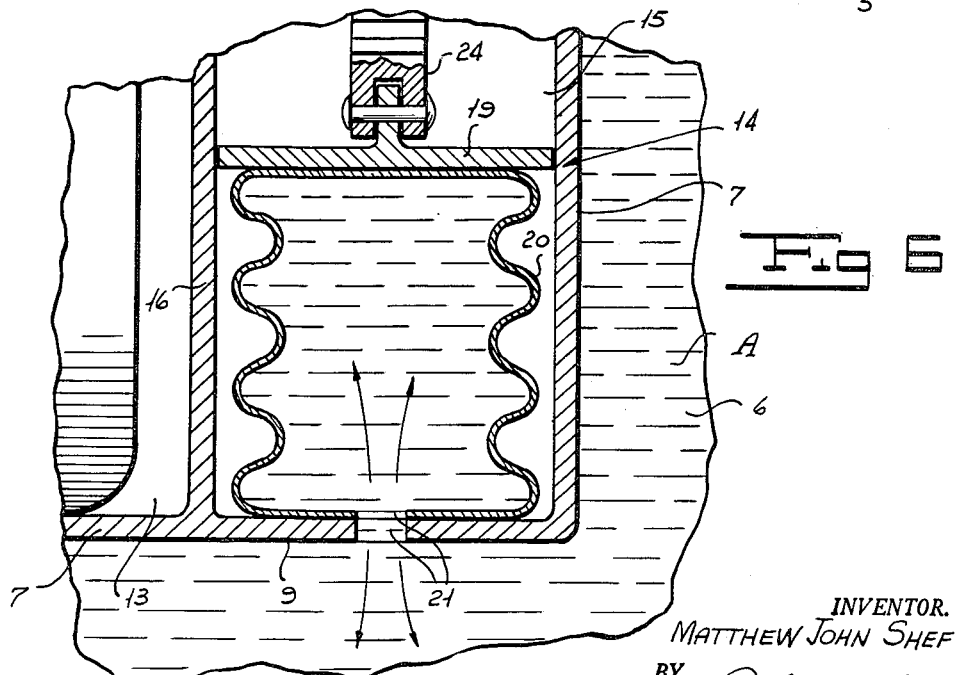

2,755,619

EXPANSIBLE CHAMBER MOTOR OPERATED BY TEMPERATURE VARIATIONS

Matthew John Sheft, Passaic, N. J.

Application September 26, 1952, Serial No. 311,567

4 Claims. (Cl. 60—23)

My invention relates to motors and more particularly to motors actuated in response to temperature variations.

One of the principal objects of my invention is to provide a motor which is so constructed and arranged as to be actuated in response to temperature variations and which motor is capable of operating mechanisms connected thereto when so actuated.

Another object of my invention is to provide a motor of the foregoing described character wherein a suitable fluid is employed for operating the motor upon expansion and contraction of the fluid by reason of temperature changes.

An important object of my invention is to provide a motor of the foregoing described character which is simple in construction, durable in use, efficient in operation, economical in manufacture and which lends itself to a multiplicity of uses.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a vertical sectional view of a motor constructed in accordance with my invention.

Figure 2 is a sectional view taken on the line 2—2 of Figure 1.

Figure 3 is a horizontal sectional view taken on the line 3—3 of Figure 1.

Figure 4 is a detail elevation of the piston and rack bars on an enlarged scale.

Figure 5 is a top plan view, partly in section, of the motor.

Figure 6 is an enlarged detail sectional view of the bellows and adjacent components.

In practicing my invention, as illustrated in the drawings, I provide a cuboidal receptacle 5 formed with a chamber 6 in which is disposed a case 7 having its top, bottom and side walls 8, 9 and 10, respectively, integrally connected to and supported by the front wall 11 of the receptacle. The front wall 11 of the receptacle is formed with an opening 12 communicating with the interior of the front section 13 of the case, the rear section 14 of the case constituting a cylinder having a bore 15 defined by a side cylindrical wall 16 and the top and bottom walls 8 and 9. The receptacle is filled and has hermetically sealed therein a suitable fluid, for instance, ethyl alcohol A, which is highly responsive to temperature variation with respect to contraction and expansion for a purpose hereinafter made apparent.

The front section 13 of the case 7 is adapted to have mounted thereon a suitable and desired driven apparatus, for instance, a clock C, provided with the usual winding shaft 17 equipped with an overload preventing, unidirectional slip clutch 18 and which shaft extends through the wall 16 and into the bore 15. Reciprocally mounted within the bore 15 is a piston or piston-like guide 19 having its lower radial face fixedly connected to and disposed in sealed relation with the upper end portion of a bellows 20 mounted within said bore 15 between the piston 19 and the bottom wall 9 of the case. The lower end portion of the bellows 20 is fixedly connected to and disposed in sealed relation with the bottom wall 9. The interior of the bellows and chamber 5 communicate with each other by means of registering openings 21 provided in the lower end portion and the bottom wall 9 whereby the chamber and the bellows are both filled with the alcohol A, it being understood that the bellows is constructed of a suitable pliable and liquid impervious material.

The top wall 8 of the cylinder is formed with and has disposed thereover a casing 22 having a well 23 which communicates with the bore 15 of the cylinder and is open to the atmosphere through the top of the receptacle. The well 23 reciprocally receives a pair of spaced rack bars 24 and 25, respectively, having their lower ends pivotally connected to the upper radial face of the piston 19. The bars 24 and 25 are connected together by means of a coil spring 26 for urging the bars towards each other and in engagement with a pinion 27 disposed between the bars and fixed to the shaft 17 of the clock C. The teeth of the bars 24 and 25 and the pinion 27 are of the ratchet type and are so constructed and arranged that upon upward movement of the piston 19, caused by extension of the bellows by reason of expansion of the alcohol due to temperature change, the teeth of the bars 24 and 25 will mesh with and ratchet relative to the teeth of the pinion 27, respectively, and thus effect counter-clockwise rotation of both the pinion and shaft 17, as indicated by the arrow B in Figure 2 of the drawings, the resiliency of the spring 26 permitting said ratcheting. Upon downward movement of the piston, due to compressing movement of the bellows upon contraction of the alcohol by a temperature change, the teeth of the bar 24 will ratchet relative to the teeth of the pinion while the teeth of the bar 25 will mesh with the teeth of the pinion and thereby maintain the counter-clockwise rotation of the pinion and shaft 17. Thus, it will be seen that upon reciprocation of the piston, the pinion is rotated in one direction only over its circumferential path to effect winding of the clock. When the spring of the clock has been sufficiently wound by the shaft 17, the unidirectional slip clutch 18 will function in the usual manner to render the pinion ineffective for winding the clock and thus permit continuous and idle rotation of the pinion until such time as the clutch is rendered effective.

By way of exemplification, assume that the following factors and conditions prevail:

1. Fluid within the receptacle 5 is alcohol (ethyl).
2. Volume of alcohol within the receptacle 5 and bellows 20 is 1,877 cc., the chamber 6 and bellows being completely filled.
3. Expansion of 1,877 cc. of alcohol per 1° C. of temperature change is 2.06 cc.
4. Expansion of cuboidal space of receptacle (aluminum) per 1° C., is .04 cc.
5. Working element of alcohol minus counteraction of aluminum receptacle 5 is 2.02 cc., i. e. net volume of expansion of alcohol per 1° C., variation.
6. Allowing normal average temperature changes as applied to climate of United States from 100° F. to −10° F. and interpreting this to a basic temperature change in centigrade (conversion) is 61° C.
7. Since the net expansion of 1,877 cc. alcohol per 1° C. is 2.02 cc., then for 61° C. it gives an overall volume change of 123.22 cc.
8. With the bellows 20 having a mean diameter of 4 cm., the injection or expulsion of 123.22 cc., of alcohol (from 100° F. to −10° F.) will cause the bellows 20 to expand or contract (up or down) a linear distance of 9.8 cm.

9. If a temperature change of 61° C. therefore causes a linear motion (of a 4 cm. diameter bellows) thru 9.8 cm., then a 1° C. change will cause it to have a range of .16 cm., or 1.6 mm.

10. Therefore, with the pinion 27 being 4 mm. in diameter or a circumference of 12.56 mm. and a rack bar range of motion of 1.6 mm. per 1° C., change in temperature, applying the two, a bar against the pinion, the result is a rotation of the pinion 27 thru 12.73% of its circumference or thru an arc of 45.82°.

11. Finally, since the temperature may rise or fall indoors or outdoors several times daily, the pinion 27 would be constantly turning slightly (in one direction only as noted in Figure 2) but further than this, considering a 24 hour change of temperature of an average of 15° F., approximately 9° C., then the pinion will rotate a total arc of 114.57% of its circumference or better than once around.

12. This force, when applied to the winding of the spring of the clock C, will be sufficient to keep the clock running without interruption. To preclude overwinding, the clutch 18 will permit the pinion 27 to rotate without attendant winding.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In combination, a receptacle having a chamber, a case disposed within said chamber and adapted to contain a driven device having a shaft equipped with an overload preventing clutch, said case provided with a cylinder and a piston-like guide reciprocally mounted within said cylinder, a bellows disposed within said cylinder and fixed to said piston-like guide within said cylinder for actuating said guide, driving means for rotating said shaft and connected to said piston-like guide for movement therewith, said chamber communicating with the interior of said bellows to permit said chamber and said bellows to contain a common liquid expansible in response to temperature variation whereby to effect actuation of said bellows upon said variation.

2. In combination, a receptacle having a chamber, a case positioned within said chamber and adapted to contain a driven device, a shaft for said device, said case provided with a cylinder, a piston-like guide reciprocally mounted within said cylinder, a bellows connected to said piston-like guide within said cylinder for actuating said guide, a pinion fixed to said shaft for rotating the latter, a pair of rack bars connected to said piston-like guide and coacting with said pinion to rotate said pinion upon movement of said piston-like guide, said chamber communicating with the interior of said bellows to permit said chamber and said bellows to contain a common liquid expansible in response to temperature variation whereby to effect actuation of said bellows upon said variation.

3. In combination, a receptacle formed with a chamber and a case arranged within said chamber for containing a driven device, said case being provided with a cylinder having a bore, a shaft for said driven device and having an end section extending into said bore adjacent one end of said cylinder, a piston-like guide reciprocally mounted within said bore, a bellows disposed in said bore adjacent the other end of said cylinder and fixed to said guide within said bore for actuating said guide, a pinion fixed to said section of said shaft for rotating the latter, a pair of spring tensioned rack bars pivoted to said piston-like guide for movement by the latter within said bore adjacent said first mentioned end and coacting with said pinion to rotate said pinion and thus drive said device upon movement of said piston-like guide, said chamber communicating with the interior of said bellows to permit said chamber and said bellows to contain a common liquid expansible in response to temperature variation whereby to effect actuation of said bellows upon said variation.

4. In combination, a receptacle formed with a chamber and a case arranged within said chamber for containing a driven device, said case being provided with a cylinder having a bore, a shaft for said driven device and having an end section extending into said bore adjacent one end of said cylinder, a piston-like guide reciprocally mounted within said bore, a bellows disposed in said bore adjacent the other end of said cylinder and fixed to said guide within said bore for actuating said guide, a pinion fixed to said section of said shaft for rotating the latter, a pair of spring tensioned rack bars pivoted to said piston-like guide for movement by the latter within said bore adjacent said first mentioned end and coacting with said pinion to rotate said pinion and thus drive said device upon movement of said piston-like guide, said chamber communicating with the interior of said bellows to permit said chamber and said bellows to contain a common liquid expansible in response to temperature variation whereby to effect actuation of said bellows upon said variation, said liquid in said chamber being disposed above, below and to a side of said case.

References Cited in the file of this patent

UNITED STATES PATENTS

| Number | Name | Date |
|---|---|---|
| 386,557 | Roberts | July 24, 1888 |
| 737,093 | Fulton | Aug. 25, 1903 |
| 795,761 | Fulton | July 25, 1905 |
| 867,418 | Ringo | Oct. 1, 1907 |
| 1,080,637 | Kenworthy | Dec. 9, 1913 |
| 2,012,674 | Schultz | Aug. 24, 1935 |
| 2,073,168 | Newell | Mar. 9, 1937 |
| 2,117,211 | Reutter | May 10, 1938 |
| 2,645,945 | Homkes | July 21, 1953 |
| 2,655,786 | Carr | Oct. 20, 1953 |

FOREIGN PATENTS

| Number | Country | Date |
|---|---|---|
| 25,485 | Austria | Aug. 25, 1906 |
| 48,488 | Switzerland | Nov. 21, 1909 |
| 624,299 | France | Apr. 2, 1927 |